Patented Oct. 15, 1946

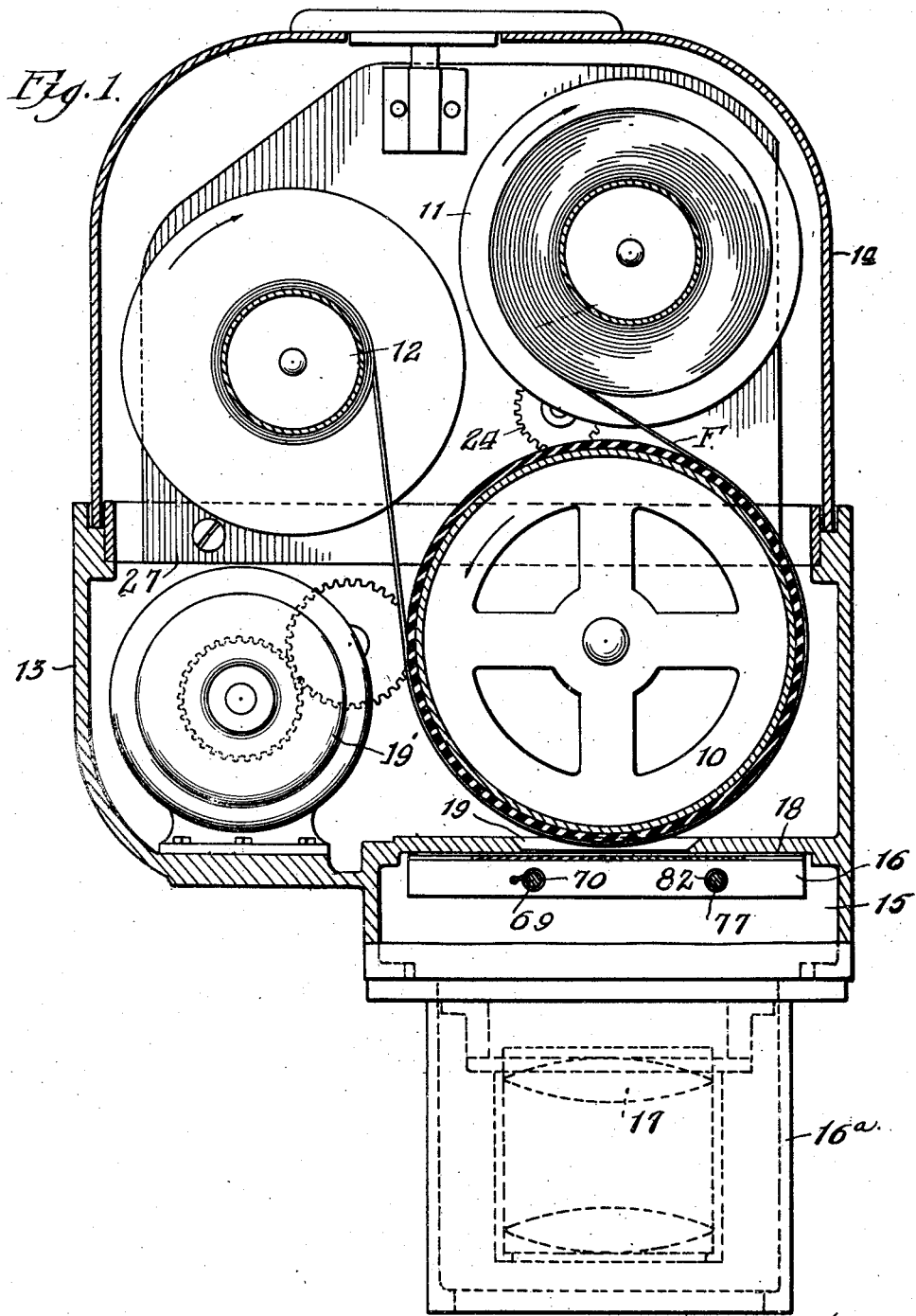

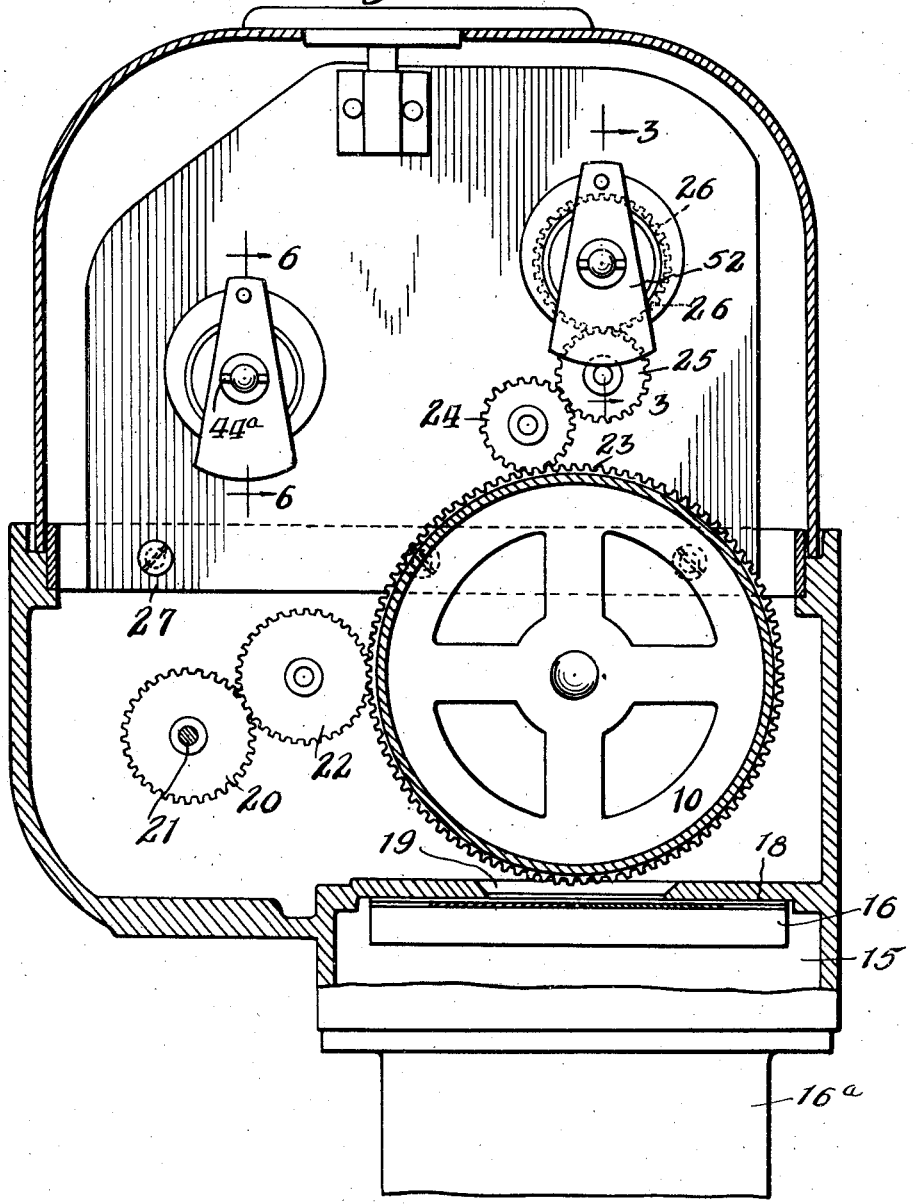

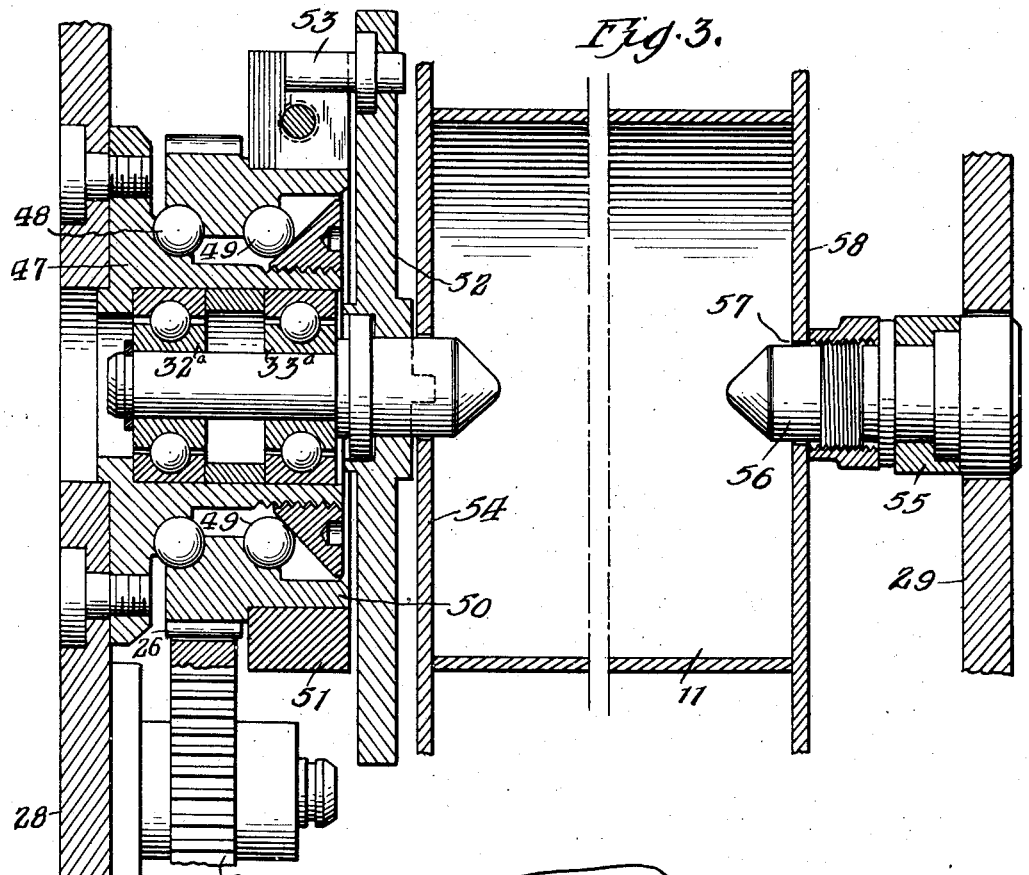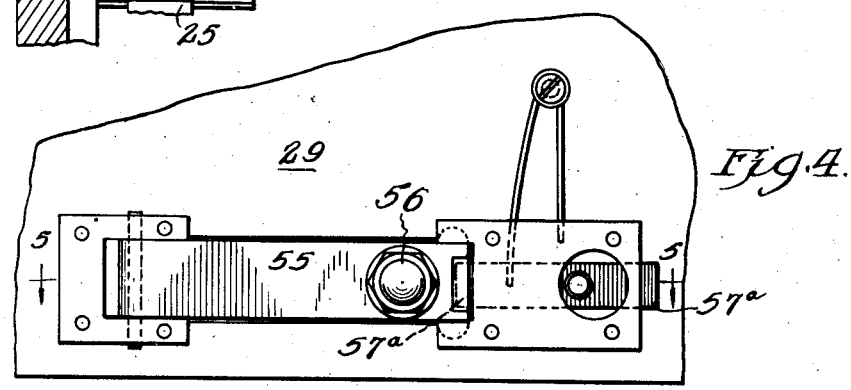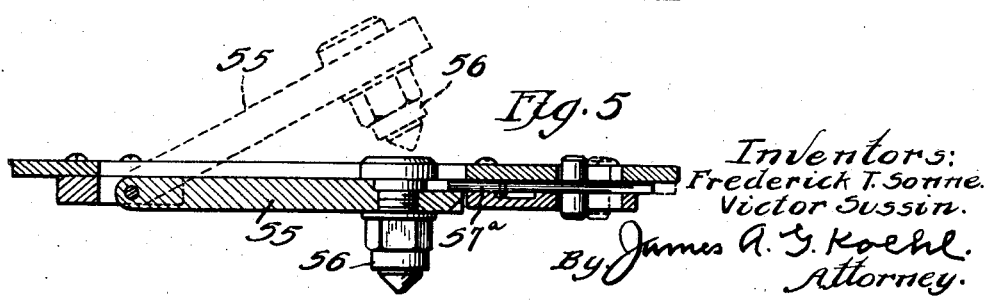

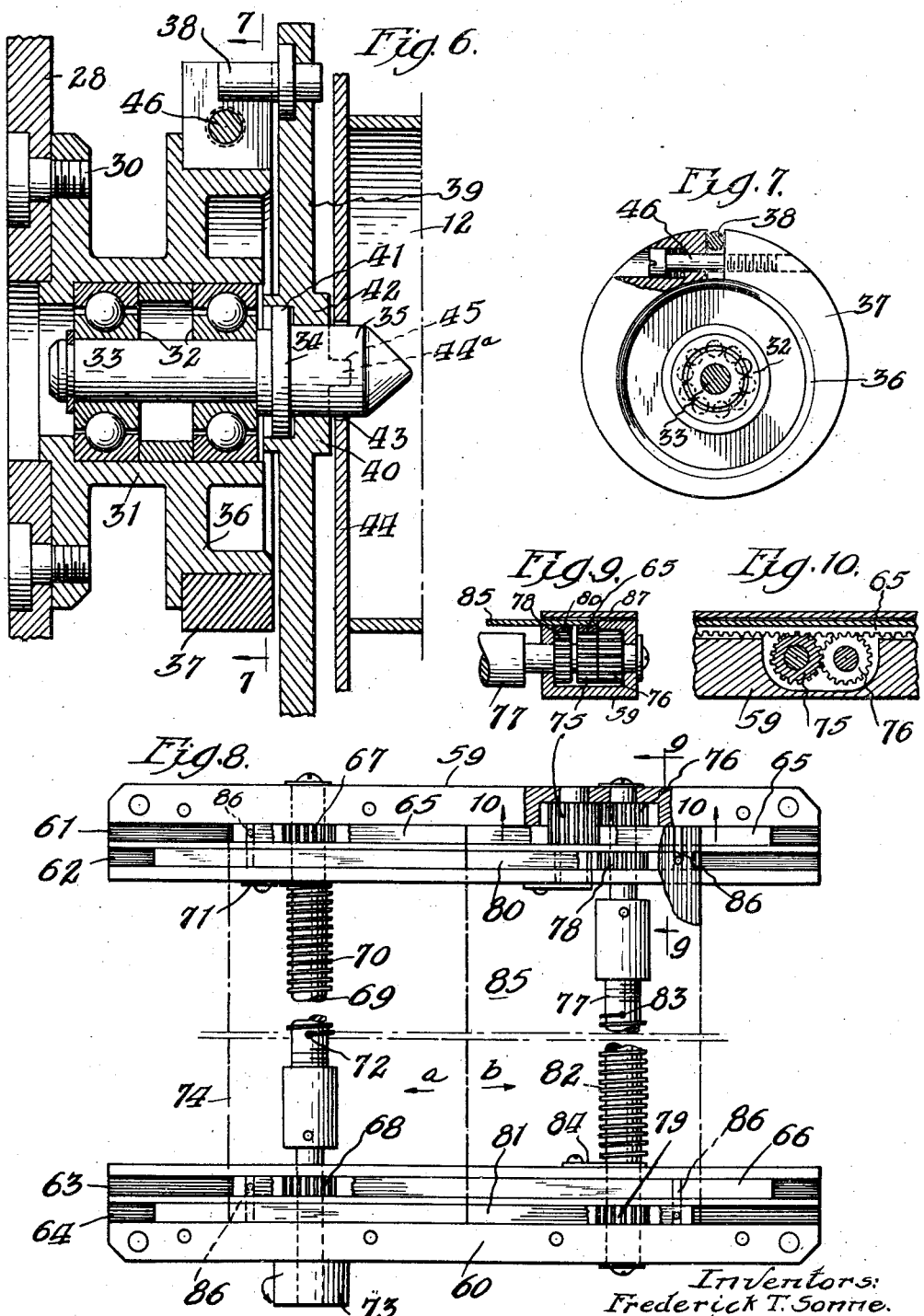

2,409,597

UNITED STATES PATENT OFFICE 2,409,597

SCANNING CAMERA

Frederick Theodore Sonne, Golf, and Victor Sussin, Chicago, Ill., assignors to Chicago Aerial Survey Company, Chicago, Ill., a corporation of Illinois Application August 16, 1943, Serial No. 498,754

2 Claims. (Cl. 95—12.5)

This invention relates to cameras, and more particularly to aerial cameras for producing a continuous, true-plan, still photograph of ground terrain from an airplane in flight. The invention is a further development of certain features of the invention shown and described in Letters Patent to Frederick Theodore Sonne, No. 2,307,-646, dated January 5, 1943.

In cameras of the type aforementioned, a long-length, photographic film strip is moved through a photographic field at a speed in exact synchronism with the ground image, thereby insuring production of a continuous, clear, sharp and distortionless true-plan still picture.

The herein invention is a disclosure of only those features which constitute the gist of the claimed improvements and while said improvements are primarily designed and intended for use in connection with aerial cameras, this shall not be viewed with any thought or intention of limiting useful application of the invention to any well known photographic apparatus wherein it is desired to produce like results with the same or equivalent mechanical elements as those herein disclosed.

An object of the invention is to provide apparatus for the continuous translation at an assigned or predetermined speed of a photographic film strip through the photographic field of the camera in a manner which satisfies exacting photographic requirements and insures production of more accurate photographs than has been possible heretofore with use of prior photographic apparatus.

A still further object is to provide reeling and unreeling organizations, the coactive operations of which are carefully calculated to insure translation of the film through the photographic field of the camera at a rate which is always exactly equal to both the rate of ingress of the film to and rate of egress of same from said field.

Another object is to provide means for gripping the film curvilinearly during angular motion at constant speed of a driven element to thereby avoid slippage of the film in any direction during continuous translation thereof and to hold constant the distance between the film and an exposure aperture.

Another object is to provide a transmission wherein energy developed at certain of the elements employed is frictionally employed at others of the elements to insure that the exposed film will be reeled in exact accordance with the rate at which it is fed to a positively driven translating mechanism.

Another object is directed to improve film translating mechanisms operating in coaction with each other to insure an even rate of motion of the film at the exposure aperture of the camera regardless of the amount of film contained at any instant upon the respective magazine and take-up spools of said mechanisms.

The invention further consists in the features of construction, combinations of elements, arrangements of parts, and the coactive relationship of the various organizations of elements as will be more fully set forth herein.

In drawings in which a preferred embodiment of the invention is illustrated,

Figure 1 is a vertical section through the camera;

Figure 2 is a view similar to Figure 2 with the pay-off and take-up rolls removed for the purpose of clearness;

Figure 3 is a vertical section on an enlarged scale of the friction drive for the take-up spool;

Figure 4 is a view in elevation of the bearing bracket for the take-up and pay-off spools;

Figure 5 is a section taken on line 5—5 of Figure 4;

Figure 6 is a section, taken on the line 6—6 of Fig. 2.

Figure 7 is a view partly in elevation and partly in section taken on the line 7—7 of Fig. 6.

Figure 8 is a view partly in plan and partly in elevation of the exposure aperture, parts being removed and parts being broken away for a clear understanding of the structure;

Figure 9 is a section taken substantially on 9—9 of Figure 8, and

Figure 10 is a section taken substantially on the line 10—10 of Figure 8.

In carrying the invention into practice, use is made of a large diameter, positively driven, horizontally mounted drum 10 around which a photographic film strip is trained and from which the film is conducted to a take-up spool 11 in exact synchronism with the rate at which the film is pulled or unwound from a pay-off or magazine spool 12.

All of the aforementioned elements are contained in a housing structure consisting of a lower section 13 and a removable upper section 14, and, as shown, said lower housing section is formed or suitably provided with means 15 having a mechanism 16 for forming at the photographic field of the camera an exposure aperture of any desired size, across which the film is adapted to be continuously moved at any predetermined speed.

Depending from said means 15 is a barrel 16a containing a photographic optical system 17, the axis of the lens of which is coaxial relative to the axis of rotation of the drum 10. Said means is provided with a horizontally disposed table or plate 18 which directly underlies said drum 10, it being preferred that said plate shall have a slot 19 therein of such form and proportions as to accommodate a portion of the drum in a manner providing only a very scant clearance between the face of said drum and said mechanism 16.

At 19' in the lower housing section 13 is an adjustable speed electric motor of any well known type, the fixed gear 20 on the driven shaft 21 of which constitutes an element in a gear train which includes an intermediate gear 22 meshing with said gear 20 and with a larger diameter gear 23 fixed to one end of said drum 10. Said gear train also includes intermediate intermeshing gears 24 and 25, the former meshing with said drum gear 23 and the latter with a gear 26 of a frictional driven system for the aforestated take-up spool 11. The ratios of the gears of said train is computed so that in coaction with features of the invention to be described presently, the speed of the film through the photographic field of the camera is invariable and always in perfect synchronism with whatever is the speed of the motor 19' at any instant and whereby the film speed is likewise in synchronism or proportional to the rate at which the film is wound onto the take-up spool 11.

Mounted inside the camera housing and preferably attached at 27 to opposite walls of section 13 of said housing are parallel spaced apart plates 28 and 29. These plates provide a common mounting for the spools 11 and 12, their adjuncts and the gears 24 and 25.

Referring now to Figure 6 of the accompanying drawings, it is noted that there is secured at 30 to the inner face of plate 28, a hollow tubular member 31 having ball bearings 32, the inner races of which receive a shaft 33 whose inner end is formed with a circular flange 34 having a stub shaft 35. Said member 31 has preferably formed therewith as an integral part thereof a cylindrical friction element 36, which is complemental to a split friction ring 37. Passing into the space between the meeting ends of said ring is a pin 38, which projects from one side of a rotational inertia mass 39, the medial portion of which is formed with a hub 40. Received in the enlarged bore 41 of said hub is the aforementioned flange 34 of shaft 33, the smaller bore 42 of said hub accommodating the stub shaft 35 in a manner enabling free insertion of said shaft in a coaxial opening 43 in the head 44 of the pay-off spool 12. Formed on the mass 39 are splines 44a adapted to enter correspondingly shaped keyways 45 in said head 44.

Adjustably connecting the meeting ends of said friction ring 37 is an adjusting screw 46 by means of which pressure of the ring against the friction face of said element 36 can be selectively controlled.

It follows that from the manner of mounting the pay-off spool 12, any desired amount of friction can be placed upon said spool and controlled with such nicety and exactness as to prevent over-running of the film strip and whereby the speed at which the film is pulled from said spool will be in exact synchronism with the speed of said film through the focal field of the camera. Other structural features of the organization comprising the pay-off spool will be referred to in the description of the take-up spool organization.

The organization of instrumentalities comprising the take-up spool is structurally and functionally similar to the pay-off spool organization. However, in this case, the shaft 33a and its supporting ball bearings 32a are mounted in a member 47, the external form of which is such as to co-act with the gear 26 and provide races for axially spaced apart antifriction bodies 48 and 49. Said gear 26 is formed with an annular friction face 50 and co-acting therewith is a split friction ring 51, similar, if not identical in every respect to the ring 37 of the pay-off spool organization. The inertia mass 52 has its pin 53 disposed between the meeting ends of said ring 50. As this inertia mass is the same structurally and functionally as the mass 39 and is removably splined to the head 54 of take-up spool 11, it will suffice to say that as regards the ends of spools 11 and 12 adjacent to plate 29, these are each similarly supported by said plate. In Figure 3, the means for supporting the spool 11 comprises a pivoted bracket 55 on said plate, the same having a stub shaft 56 adapted when the bracket is swung from the dotted to the full line position shown at Figure 5 to enter a bearing opening 57 in the head 58 of spool 11. When in the full line position, a resilient latching device 57a is engageable therewith and the bracket thereby maintained in a rigid spool supporting position. By the means thus provided, the spools 11 and 12 are readily removable for replacement purposes, as will be understood.

Referring now to Figures 1, 8, 9 and 10 of the drawings for an understanding of the aperture control mechanism 16, said mechanism comprising a pair of similar guide rails 59 and 60, in the former of which are parallel longitudinally disposed channels 61 and 62, the rail 60 having parallel, longitudinally disposed channels 63 and 64. In the channels 61 and 63 of rails 59 and 60 are slidable rack bars 65 and 66 respectively in mesh with gear pinions 67 and 68 carried by a manually actuable shaft 69. Extending around said shaft is a coil spring 70, one end of which is fixed at 71 to the rail 59, while the other end thereof is fixed at 72 to said shaft. At one end, the shaft has a control knob 73, adapted, when turned in a counter-clockwise direction to impart to a flat blade 74 motion in the direction of arrow "a," Figure 8.

The teeth of rack bar 65 also mesh with a pinion 75, the latter, in turn, meshing with a pinion 76 at one end of a shaft 77. Also upon said shaft 77 are pinions 78 and 79, the former meshing with the teeth of a rack bar 80 in channel 62 of rail 59 and the latter meshing with the teeth of rack bar 81 in the channel 64 of rail 60. Around the shaft 77 is a coil spring 82, one end of which is secured at 83 to the shaft and the other end to the rail 60 as at 84. Said spring is wound counter-clockwise as distinguished from the clockwise direction of the wound portions of spring 70. The blade 85 of which the rack bars 80 and 81 are parts is in the same general plane as aforementioned blade 74 and, as shown, these blades have pin and slot connection at 86 with their respective rack bars. Cover strips 87 are removably secured to said rails 59 and 60 and function to maintain necessary intermeshing relationship of the pinion 67, 68, 78 and 79 with their respective rack bars 65, 66, 80 and 81.

From the above description of the exposure aperture organization, it is appreciated that by virtue of the office of the springs 70 and 82, the blades 74 and 85 tend to assume relative positions such that their meeting or opposed edges are in abutting relation along a line running parallel to the longitudinal axis of the drum 10. The arrangement just described is such that the aperture formed between the opposite edges of the blades is perpendicular to the axis of rotation of the drum 10, and that a perpendicular line intersecting the longitudinal center line of the aperture will also intersect the axis of said drum. Relative motion can be imparted to said blades by selective control of knob 73 and by reason thereof the size of the aperture between said opposed edges can be regulated at will, the opening direction of motion of both blades being along the directional lines, arrows (a) and (b), Figure 8. By reason of the relationships of the parts referred to and upon referring to Figure 1 of the drawings, it is noted that the lens of the optical system 17 is horizontal, the vertical axis of which intersects the longitudinal center line of the exposure aperture at the midpoint of said aperture.

Figure 1 shows the camera in the position it occupies upon an airplane, the focal axis of the lens system being perpendicular and intercepted by the horizontal plane of the aperture blades 74 and 85. Each of the spools 11 and 12 and the large diameter drum 10 operate about horizontal axes which are parallel to each other. In this figure, it is assumed that the direction of flight is as indicated by the arrow (a) and that the exposure aperture is perpendicular and at right angles to the line of flight.

When making a photographic picture of terrain from an airplane in flight, certain factors must be considered to the end that well defined pictures will result from exposures made at different altitudes and at varying or predetermined flight speeds. In the instant case and assuming that the photographer has made all necessary mathematical computations and therefore knows (1) the altitude of the plane, and (2) has accurately predetermined the speed of the film through the focal field of the camera so that the ground speed and flight speed are in synchronism, it then, merely is necessary to determine the size of the exposure aperture for the shot to be made and to set the motor 19 in operation for continuous translation of the film at a predetermined, invariable speed through said focal field.

The above factors must necessarily be considered and carefully observed at any instant an exposure is made. To the end that clear, well defined sharp images of objects will be further assured when making a panoramic photograph of the terrain, other important factors must be observed and means employed to prevent faulty or inaccurate or incomplete photographic reproduction of ground objects. It is these last named factors that have been fully considered and studied with the result that heretofore inaccuracies occurring when making aerial photographs can now be avoided or eliminated by the mechanisms or organizations of elements, the structural features of which have now been fully described. The functional results flowing from said structural elements are, as follows:

The altitude and the flight speed of the plane being known to the operator at the instant a photograph is to be taken, the motor 19 is placed in operation at a speed exactly in synchronism with the ground speed, it being understood that there shall be such discriminate use of the aperture mechanism as to provide in the focal plane of the camera an exposure aperture of appropriate photographic proportions. The blades 74 and 85 move laterally at equal speeds relative to a line drawn perpendicularly through the lens system thus insuring that regardless of the size of the selected aperture, same will be centrally disposed.

Rotational motion is simultaneously imparted to the spools 11 and 12 and the drum 10, the latter having its peripheral face uniformly covered with a soft, friction inducing material such as a good grade of rubber. The film strip F passes downward from the pay-off spool 12, thence under and substantially entirely around the drum 10 and with its Celluloid side next to the soft peripheral face of said drum. From the drum, the strip is continuously wound onto the frictionally controlled take-up spool 11.

Upon referring to Figures 1 and 6 of the accompanying drawings, it is observed that by reason of a preselected degree of pressure between the element 36 and the ring 37 friction is induced that tends to retard free rotational motion of spool 12, it being borne in mind that the only energy applied to this spool is the pulling force resulting from positive rotation of drum 10. In this manner there is definite assurance that, at no instant, will more film leave spool 12 than can be timely handled by drum 10. In other words, the rate of delivery of the film to the drum is in absolute synchronism with the rate of delivery of the exposed film in the direction of take-up spool 11.

Referring now to Figures 1 and 3, it again is noted that any selected amount of friction can be induced between the friction face of driven gear 26 and the friction ring 51, whereby spool 11 operates in perfect synchronism with drum 10.

By preventing more film being paid from spool 12 than can be paid onto spool 11 at any instant and by maintaining intimacy of contact between the film and said drum, the distance between the exposure aperture and the film is held constant. These niceties come in consequence of a new and novel order of elements and co-action of the elements to insure that there never is present a condition of over-running or slippage of the film at the exposure aperture. As a result, thereof, clear, well defined and faithful photographic reproductions of images of ground objects are assured in a manner not heretofore possible with devices of the prior art.

In addition to the main features above referred to, attention is directed to certain structural details. When the upper section 14 of the housing is removed, complete access is had to all operating parts, thus making for quick and convenient threading of the film through the camera and removal and replacement of film as and when desired.

While the gear train above referred to provides a positive drive for the drum 10, gears 23, 24 and 25 in said train function to transfer rotational motion to spool 11 by reason of controlled friction between the integral annular friction face 50 of gear 26 and aforementioned friction ring 51, the latter, for all intents and purposes being a part of the inertia mass 52 to which the spool is splined. Particular stress is placed upon the frictionally driven spool 11 in combination with the gear driven drum 10 and the frictionally retarded rotary pay-off spool 12, as the precision with which these coordinated organizations function insures that the film is never fed faster than it is paid onto spool 11 and that the speed of the film through the photographic field is held definitely constant or exactly as predetermined by any selected rotational speed of the motor 19.

No claim is made for the mere use of a soft rubber facing for the rotary exposure drum 10, except in the environment in which it is used in carrying out our invention. As rotational motion of spool 12 can be controlled so as to offer any desired amount of friction to its rotation, and as the friction driven means for spool 11 insures that the peripheral speed of said spool will vary exactly in accordance with the increase in diameter of the coil being formed on the spool, it follows that all moving parts of our camera operate in necessary synchronism. As the film is always being pulled from the spool 12 and onto spool 11, the film wrap which substantially extends entirely around drum 10 is firmly pressed flatwise against the soft rubber face of said drum, thereby securing a positive driven relation of the film to said drum. This not only serves to insure positive motion of the film across the exposure aperture, but, and in addition thereto to maintain a fixed distance between the aperture and the film and prevent slippage of the film.

While a preferred embodiment of the invention has been shown and described, it will be understood that changes in the form, arrangements, proportions, sizes and details thereof may be made without departing from the scope of the invention as defined by the appended claims.

What we desire to secure by Letters Patent and claim is:

1. In an aerial camera, a vertical casing provided at its lower end with a downwardly opening exposure slit; a downwardly projecting photographic objective secured to the casing beneath said slit; a focal drum mounted in the casing above and with only scant clearance between the slit and the peripheral face of said drum; film pay-off and film pay-on spools mounted in said casing, from the former of which, the film may be trained about said peripheral face and through the space between said face and said slit thence wound onto said pay-on spool; friction inducing means including a rotatable part detachably splined to the pay-off spool at the axis of rotation thereof; friction inducing means including a rotatable part detachably splined to the pay-on spool at the axis of rotation thereof; means for positively driving the focal drum at any assigned angular velocity and for positively driving the rotatable part of the second named friction inducing means; and means by which friction at the respective friction inducing means can be controlled and the film maintained under constant tension such that the surface of contact of the film with the peripheral face of said focal drum and the distance between the slit and the effective focal point of said drum are each thereof invariable during translation of the film at any selected angular velocity, and whereby the rate of translation of the film across said slit is the same as that at which the film is paid from the pay-off spool and the rate at which it is wound onto said pay-on spool.

2. In an aerial camera, a vertical casing provided at its lower end with a downwardly opening exposure slit; a downwardly projecting photographic objective secured to the casing beneath said slit; a focal drum mounted in the casing above and with only scant clearance between the slit and the peripheral face of said drum; film pay-off and film pay-on spools mounted in said casing, from the former of which, the film may be trained about said peripheral face and through the space between said face and said slit thence wound onto said pay-on spool; friction inducing means including a rotatable part splined to the pay-off spool at the axis of rotation thereof; friction inducing means including a rotatable part splined to the pay-on spool at the axis of rotation thereof; means for positively driving the focal drum at any assigned angular velocity and for positively driving the rotatable part of the second named friction inducing means; and means by which friction at the respective friction inducing means can be controlled and the film maintained under constant tension such that the surface of contact of the film with the peripheral face of said focal drum and the distance between the slit and the effective focal point of said drum are each thereof invariable during translation of the film at any selected angular velocity, and whereby the rate of translation of the film across said slit is the same as that at which the film is paid from the pay-off spool and the rate at which it is wound onto said pay-on spool.

FREDERICK THEODORE SONNE.
VICTOR SUSSIN.